United States Patent
Cowelchuk et al.

(10) Patent No.: US 7,147,808 B2
(45) Date of Patent: Dec. 12, 2006

(54) VEHICLE PART WITH INTEGRATED IMPACT MANAGEMENT FEATURE AND METHOD OF MAKING SAME

(75) Inventors: Glenn A. Cowelchuk, Chesterfield, MI (US); Robert J. Adams, Ypsilanti, MI (US); Kenneth W. Shaner, Howell, MI (US); Nelson E. Williams, Jr., Saline, MI (US)

(73) Assignee: Lear Corporation, Southfield, MI (US)

( * ) Notice: Subject to any disclaimer, the term of this patent is extended or adjusted under 35 U.S.C. 154(b) by 43 days.

(21) Appl. No.: 10/885,154

(22) Filed: Jul. 6, 2004

(65) Prior Publication Data

US 2006/0008620 A1    Jan. 12, 2006

(51) Int. Cl.
*B29C 41/08* (2006.01)
*B29C 44/06* (2006.01)

(52) U.S. Cl. .................. 264/46.4; 264/255; 264/309

(58) Field of Classification Search ............. 264/46.4, 264/255, 309
See application file for complete search history.

(56) References Cited

U.S. PATENT DOCUMENTS

| | | | |
|---|---|---|---|
| 3,872,199 A * | 3/1975 | Ottinger | 264/46.4 |
| 3,922,429 A | 11/1975 | Welch et al. | |
| 4,136,226 A | 1/1979 | Gilman | |
| 4,389,454 A * | 6/1983 | Horacek et al. | 428/318.6 |
| 5,082,609 A | 1/1992 | Rohrlach et al. | |
| 5,116,557 A * | 5/1992 | Debaes et al. | 264/46.6 |
| 5,389,317 A | 2/1995 | Grimmer | |
| 5,466,412 A | 11/1995 | Parker et al. | |
| 5,620,636 A | 4/1997 | Kawai et al. | |
| 5,662,996 A * | 9/1997 | Jourquin et al. | 428/318.8 |
| 5,885,662 A | 3/1999 | Gardner, Jr. | |
| 6,017,617 A | 1/2000 | Gardner, Jr. | |
| 6,071,619 A | 6/2000 | De Winter | |
| 6,213,540 B1 | 4/2001 | Tusim et al. | |
| 6,352,658 B1 * | 3/2002 | Chang et al. | 264/46.4 |
| 6,362,302 B1 | 3/2002 | Boddie | |
| 6,544,449 B1 | 4/2003 | Gardner | |
| 2003/0180498 A1 | 9/2003 | De Winter et al. | |

* cited by examiner

*Primary Examiner*—Allan R. Kuhns
(74) *Attorney, Agent, or Firm*—Brooks Kushman P.C.

(57) ABSTRACT

A method of making a vehicle part includes spraying material proximate a surface of a tool to form a skin layer, and spraying material onto the skin layer to form a resilient layer. The method further includes removing the skin layer and the resilient layer from the tool and positioning the layers in a mold. Next, the method involves applying material onto the resilient layer to form a rigid substrate on the resilient layer.

22 Claims, 2 Drawing Sheets

VEHICLE PART WITH INTEGRATED IMPACT MANAGEMENT FEATURE AND METHOD OF MAKING SAME

BACKGROUND OF THE INVENTION

1. Field of the Invention

The invention relates to vehicle parts for use in motor vehicles, and to a method of making such parts.

2. Background Art

Prior vehicle parts and manufacturing methods are disclosed in U.S. Pat. Nos. 3,922,429; 5,082,609; 6,017,617 and 6,544,449, for example.

SUMMARY OF THE INVENTION

Under the invention, a method of making a vehicle part is provided. The method includes the steps of spraying material proximate a surface of a tool to form a skin layer; spraying material onto the skin layer to form a resilient layer; removing the skin layer and the resilient layer from the tool; positioning the skin layer and the resilient layer in a mold; and applying material onto the resilient layer to form a rigid substrate on the resilient layer.

Further under the invention, a method of making a vehicle interior trim part includes applying a coating on a tool, the coating comprising aliphatic polyurethane. Next, the method includes spraying material on the coating to form a skin layer, the skin layer comprising aromatic polyurethane. The method further includes spraying material onto the skin layer to form an expanded elastomer layer that comprises expanded polyurethane. The expanded elastomer layer is formed to include a first portion having a first general thickness, and a second portion having a second general thickness greater than the first general thickness. The second portion is also configured to absorb impact energy. Next, the method includes removing the skin layer and the expanded elastomer layer from the tool and positioning those layers in a mold. The method further includes applying material onto the expanded elastomer layer to form a rigid substrate on the expanded elastomer layer that includes rigid polyurethane.

A vehicle part according to the invention includes a sprayed skin layer and a sprayed resilient layer bonded to the skin layer. The resilient layer has a first portion with a first general thickness, and a second portion with a second general thickness different than the first general thickness. Furthermore, the second portion is configured to absorb impact energy. The part also includes a rigid substrate bonded to the resilient layer.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
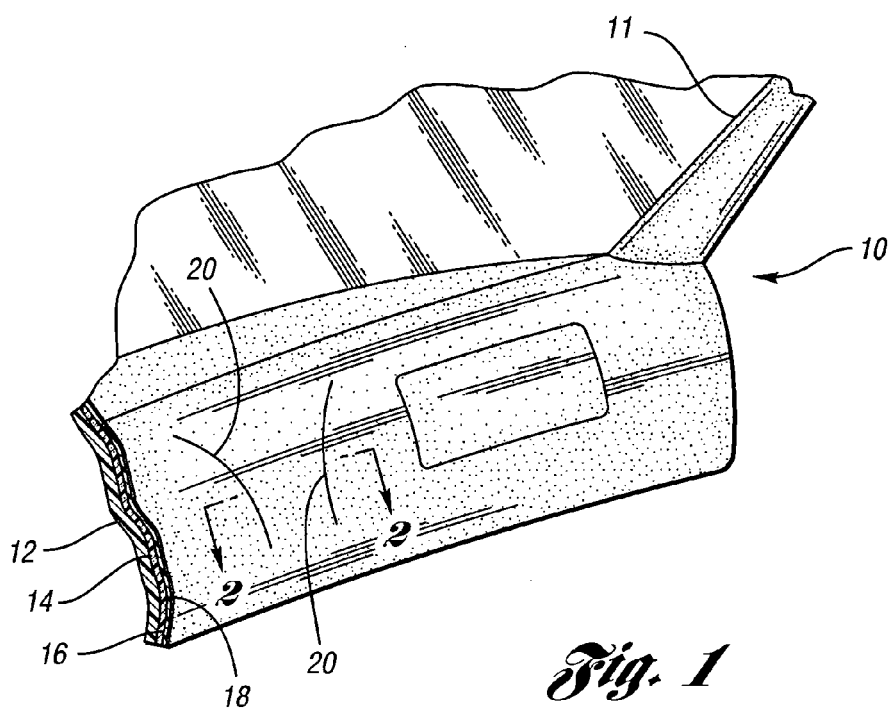
FIG. 1 is a perspective view of an instrument panel according to the invention for use with a motor vehicle.
Figure 2:
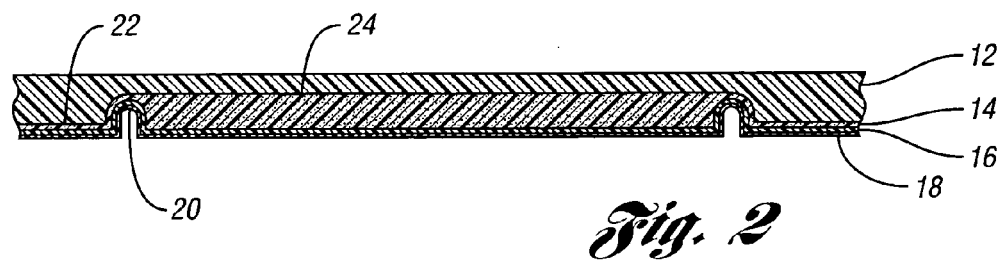
FIG. 2 is a cross-sectional view of the panel taken along line 2—2 of FIG. 1.

FIGS. 1 and 2 show an interior vehicle part, such as an instrument panel 10, according to the invention for use with a motor vehicle 11. The panel 10 includes a rigid substrate 12, a resilient layer 14 attached to the substrate 12, a skin layer 16 attached to the resilient layer 14, and a coating 18 that covers the skin layer 16 and provides an exterior appearance surface. The panel 10 may also include one or more style features, such as style lines or grooves 20, formed in one or more of the layers 12, 14, 16 and 18.

The substrate 12 is a structural member that provides support for the remainder of the panel 10, and may comprise any suitable material. For example, the substrate 12 may be made of reinforced plastic, such as fiberglass reinforced polyurethane. Additional examples of suitable plastics include polypropylene, polyethylene, acrylonitrile butadiene styrene (ABS), polycarbonate (PC), or ABS/PC blends.

The resilient layer 14 is adhered to the substrate 12 and is configured to provide a soft feel and/or an impact management characteristic to the panel 10. For example, as shown in FIG. 2, the resilient layer 14 may include a first portion 22 that is configured to provide soft feel, and a second portion 24 that is configured to provide soft feel and to absorb impact energy. Moreover, the first portion 22 has a first general thickness, and the second portion 24 has a second general thickness greater than the first general thickness. For example, the first thickness may be in the range of 1 to 5 millimeters (mm), and the second thickness may be in the range of 7 to 15 mm.

The resilient layer 14 may comprise any suitable material. For example, the resilient layer 14 may comprise an expanded elastomer such as expanded polyurethane. Furthermore, the density of the resilient layer 14 is preferably, but not necessarily, in the range of 0.3 to 3 grams per cubic centimeter ($g/cm^3$). In one embodiment of the invention, the density of the resilient layer 14 is in the range of 1 to 2.3 $g/cm^3$.

The skin layer 16 is adhered to the resilient layer 14 and coating 18. Moreover, the skin layer 16 is configured to provide a covering over the resilient layer 14 and may comprise any sufficiently dense material. For example, the skin layer 16 may be a solid layer that comprises an aromatic or aliphatic compound. As a more specific example, the skin layer 16 may be made of an elastomer such as polyurethane. Furthermore, the skin layer 16 may have any suitable thickness and density. For example, the skin layer 16 may have a thickness in the range of 0.4 to 2 mm, and a density in the range of 0.15 to 1.5 $g/cm^3$. In one embodiment of the invention, the skin layer 16 has a thickness in the range of 0.5 to 1 mm, and a density in the range of 0.95 to 1 $g/cm^3$.

The coating 18 may be used to protect the skin layer 16 and/or to provide a decorative surface for the panel 10. For example, the coating 18 may be used to inhibit sunlight or other ultraviolet light from reaching the skin layer 16. As another example, the coating 18 may be used as a paint to provide a desired color or texture to the panel 10. While the coating 18 may comprise any suitable material, in one embodiment of the invention the coating 18 is made of an aliphatic polyurethane composition. Furthermore, the coating 18 may have any suitable thickness, such as a thickness of approximately 1 mil.

Alternatively, the coating 18 may be omitted if not required for a particular application. For example, the skin layer 16 may be configured to provide a sufficiently durable and attractive surface such that the coating 18 is not needed.

Figure 3:
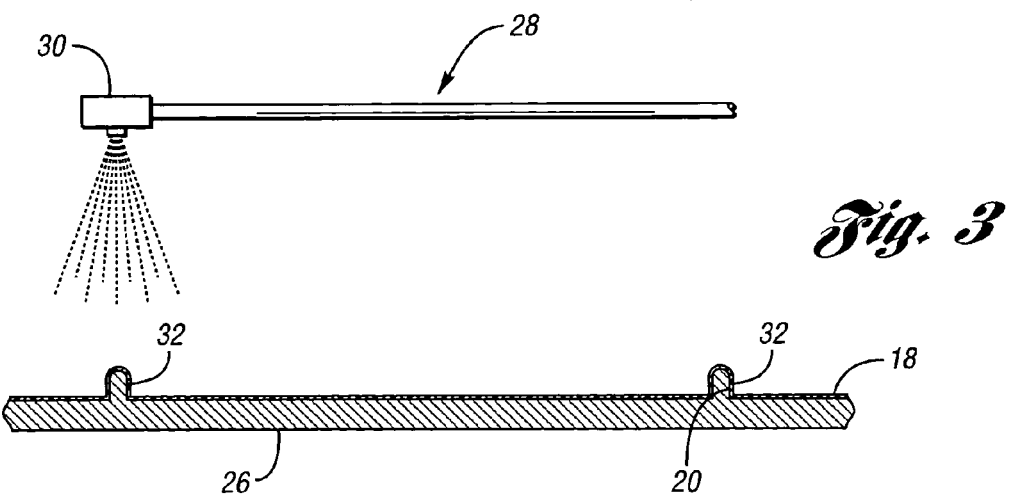
FIG. 3 is a schematic view of a mold tool and spray assembly for use in forming the panel, wherein the spray assembly is shown applying material on the tool to form a coating.

Referring to FIGS. 3–6, a method of manufacturing the panel 10 will now be described. The method may begin by spraying a mold release agent and then the coating 18 on mold tool 26 using any suitable device, such as a robotic spray assembly 28 having one or more moveable spray nozzles 30. As shown in FIG. 3, the tool 26 may have one or more projections 32 for forming the grooves 20. Furthermore, the tool 26 may be heated to any suitable temperature if desired.

Figure 4:
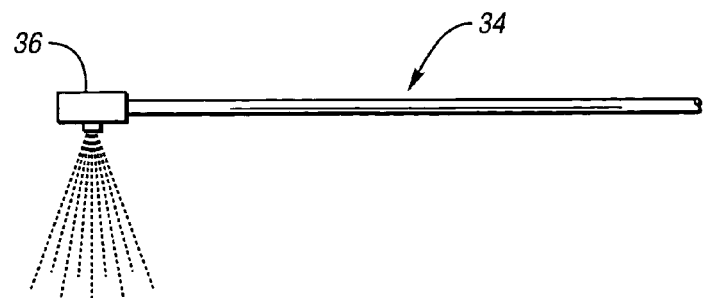
FIG. 4 is a schematic view of the tool showing application of additional material onto the coating to form a skin layer.

Next, referring to FIG. 4, the method involves spraying skin layer forming material onto the coating 18 to form skin layer 16, which bonds to the coating 18. The material may be any suitable substance and may be applied using any suitable device. For example, the material may include polyol and isocyanate, and the material may be sprayed with a robotic spray assembly 34 having one or more moveable spray nozzles 36. As a result, the skin layer 16 may be formed of polyurethane.

As mentioned above, the coating 18 may be omitted from the panel 10. In such a case, the skin layer forming material may be sprayed directly onto the tool 26, or onto a mold release agent that is applied on the tool 26, to form the skin layer 16.

Figure 5:
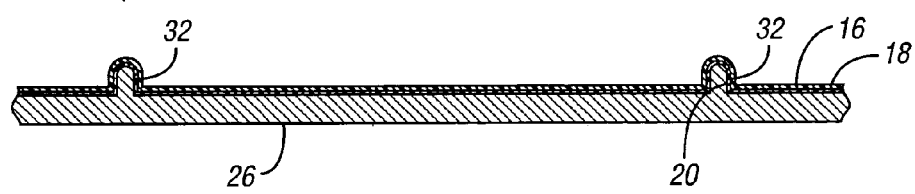
FIG. 5 is a schematic view of the tool showing application of expandable material onto the skin layer to form a resilient layer.
Figure 5:
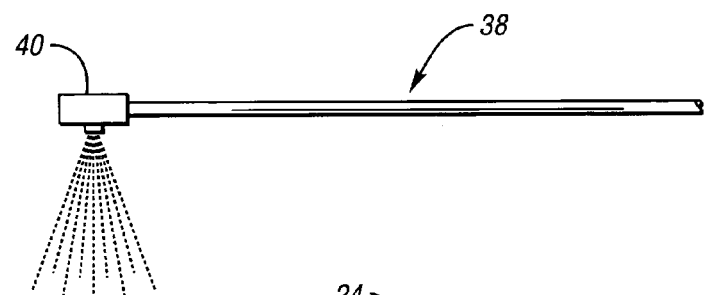

Referring to FIG. 5, the method then involves introducing expandable material onto the skin layer 16 to form resilient layer 14, which bonds to skin layer 16. The expandable material may be any suitable substance and may be applied in any suitable manner. For example, the expandable material may comprise polyol, isocyanate and a blowing agent, such as water and/or a readily volatile organic substance. A specific example of a suitable blowing agent is DABCO® BL-17 available from Air Products and Chemicals, Inc. of Allentown Pa. Furthermore, the material may be sprayed with a robotic spray assembly 38 including one or more spray nozzles 40, and the material may be allowed to free rise to achieve a desired density. With the material described above, the resilient layer 14 may be formed of expanded polyurethane.

Furthermore, the expandable material may be sprayed to achieve any desired thickness at any location, such that the thickness of the resilient layer 14 may vary. Thus, the expandable material may be lightly applied in certain areas where soft feel is a major consideration, and more heavily applied in areas that are designed to absorb impact energy. For example, the expandable material may be applied relatively lightly to form first portion 22, and more heavily applied to form second portion 24.

Next, the method involves removing the coating 18, skin layer 16 and resilient layer 14 from the tool 26 and positioning the layers 14, 16 and 18 in a mold 42 having first and second mold portions 44 and 46, respectively. The mold 42 may also have one or more projections 48 for maintaining or otherwise forming the grooves 20.

Figure 6:
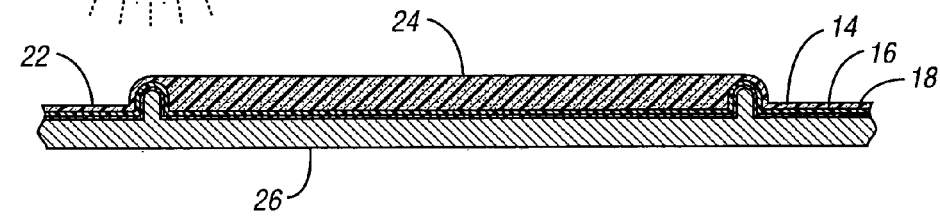
FIG. 6 is a schematic view of the coating, skin layer and resilient layer positioned between first and second mold portions of a mold, and showing application of material onto the resilient layer to form a substrate.
Figure 6:
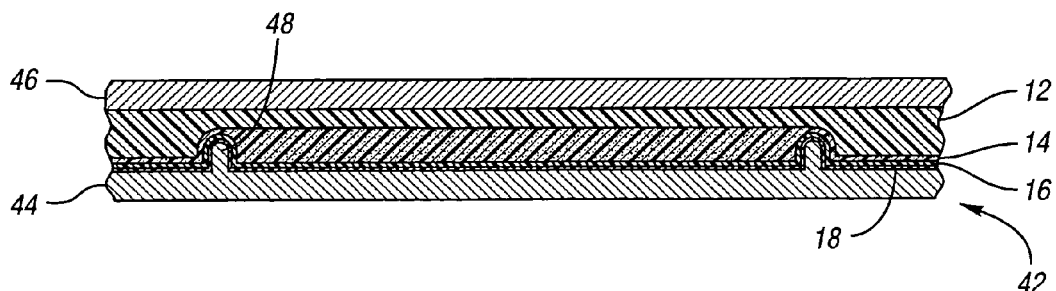

Referring to FIG. 6, the mold portions 44 and 46 are then closed together, and material is injected into the mold 42 through one or more injection passages (not shown) to form substrate 12, which bonds to the resilient layer 14. Alternatively, the material may be poured into the mold 42, and then the mold portions 44 and 46 may be closed together.

While the material may comprise any suitable substance or substances, in one embodiment, the material includes polyol and isocyanate such that the substrate 12 is formed of polyurethane. Other suitable materials include polypropylene, polyethylene, ABS, PC, or ABS/PC blends.

Whether the material is injected or poured into the mold 42, such a process may be referred to as reaction injection molding (RIM). Reinforcing material such as milled glass or glass fibers may also be added during the RIM process to provide reinforcement to the substrate 12. As another example, a reinforcing mat or preform, such as a fiberglass preform, may be positioned in the mold 42 prior to the RIM process. This process may be referred to as structural reaction injection molding (SRIM).

With the process described above, panel 10 may be formed with integral localized impact management areas and a soft feel across the entire panel 10. Furthermore, because the resilient layer 14 is combined with the skin layer 16, the thickness of the skin layer 16 may be reduced.

Examples of other vehicle parts that may be manufactured by the above method include door panels, package shelves and pillar trim panels. In a similar manner as described above, such parts may be formed with a resilient layer having integral impact management areas.

Although separate spray assemblies 34 and 38 are shown in the Figures, the spray assemblies 34 and 38 may be provided as a single spray assembly. Furthermore, if the material to be sprayed includes multiple substances, the substances may be mixed at any suitable time. For example, the substances may be mixed upstream of, within, or downstream of associated spray nozzles.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a vehicle part, the method comprising:
    applying a coating on a tool;
    spraying material on the coating to form a skin layer;
    spraying material onto the skin layer to form a resilient layer, wherein the resilient layer comprises an elastomer;
    removing the coating, the skin layer and the resilient layer from the tool;
    positioning the coating, the skin layer and the resilient layer in a mold; and
    applying material onto the resilient layer to form a rigid substrate on the resilient layer;
    wherein the coating forms an exterior appearance surface of the part.

2. The method of claim 1 wherein the skin layer comprises polyurethane.

3. The method of claim 1 wherein the resilient layer comprises an expanded elastomer.

4. The method of claim 1 wherein the resilient layer comprises expanded polyurethane.

5. The method of claim 1 wherein the substrate comprises polyurethane.

6. The method of claim 1 wherein the resilient layer is formed to have a first portion with a first general thickness, and a second portion with a second general thickness different than the first general thickness, and wherein the second portion is configured to absorb impact energy.

7. The method of claim 6 wherein the first general thickness is in the range of 1 to 5 millimeters, and the second general thickness is in the range of 7 to 15 millimeters.

8. The method of claim 1 wherein the resilient layer has a density in the range of 0.3 to 3 grams per cubic centimeter.

9. The method of claim 1 wherein the coating comprises aliphatic polyurethane, the skin layer comprises aromatic polyurethane, the resilient layer comprises expanded polyurethane, and the substrate comprises rigid polyurethane.

10. The method of claim 1 wherein applying material onto the resilient layer comprises injecting material into the mold when the mold is in a closed position to form the substrate.

11. The method of claim 10 wherein the substrate comprises reinforced polyurethane.

12. The method of claim 1 wherein applying material onto the resilient layer comprises pouring material onto the resilient layer when the mold is in an open position, and the method further includes closing the mold to shape the substrate.

13. The method of claim 1 wherein the resilient layer has a density in the range of 1 to 2.3 grams per cubic centimeter.

14. The method of claim 1 wherein the skin layer has a thickness in the range of 0.4 to 2 millimeters.

15. The method of claim 14 wherein the skin has a thickness in the range of 0.5 to 1 millimeter.

16. A method of making a vehicle interior trim part, the method comprising:
   applying a coating on a tool, the coating comprising aliphatic polyurethane;
   spraying material on the coating to form a skin layer, the skin layer comprising aromatic polyurethane;
   spraying material onto the skin layer to form an expanded elastomer layer that comprises expanded polyurethane, the expanded elastomer layer including a first portion with a first general thickness, and a second portion with a second general thickness greater than the first general thickness, the second portion being configured to absorb impact energy;
   removing the coating, the skin layer and the expanded elastomer layer from the tool;
   positioning the coating, the skin layer and the expanded elastomer layer in a mold;
   applying material onto the expanded elastomer layer to form a rigid substrate on the expanded elastomer layer, the substrate comprising rigid polyurethane.

17. The method of claim 16 wherein the expanded elastomer layer has a density in the range of 0.3 to 3 grams per cubic centimeter.

18. The method of claim 16 wherein the expanded elastomer layer has a density in the range of 1 to 2.3 grams per cubic centimeter.

19. The method of claim 16 wherein the first general thickness is in the range of 1 to 5 millimeters, and the second general thickness is in the range of 7 to 15 millimeters.

20. The method of claim 19 wherein the expanded elastomer layer has a density in the range of 0.3 to 3 grams per cubic centimeter, and the skin layer has a density in the range of 0.15 to 1.5 grams per cubic centimeter.

21. The method of claim 19 wherein the expanded elastomer layer has a density in the range of 1 to 2.3 grams per cubic centimeter.

22. The method of claim 16 wherein the coating forms an exterior appearance surface of the part.

* * * * *